(12) United States Patent
Araseki (10) Patent No.: US 8,216,454 B2
(45) Date of Patent: Jul. 10, 2012

(54) PURIFYING APPARATUS AND PURIFYING METHOD

(75) Inventor: Hideo Araseki, Chiba (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 1022 days.

(21) Appl. No.: 11/997,390

(22) PCT Filed: Aug. 9, 2006

(86) PCT No.: PCT/JP2006/315765
§ 371 (c)(1),
(2), (4) Date: Jan. 30, 2008

(87) PCT Pub. No.: WO2007/018243
PCT Pub. Date: Feb. 15, 2007

(65) Prior Publication Data
US 2010/0101957 A1   Apr. 29, 2010

(30) Foreign Application Priority Data

Aug. 10, 2005   (JP) ................................. 2005-232477

(51) Int. Cl.
*C02F 1/48* (2006.01)
*B01D 35/06* (2006.01)
(52) U.S. Cl. ............... 210/167.01; 210/223; 210/694; 210/695
(58) Field of Classification Search .......... 210/694, 210/167.01, 222, 223, 695
See application file for complete search history.

(56) References Cited

U.S. PATENT DOCUMENTS

| | | | |
|---|---|---|---|
| 3,466,154 A * | 9/1969 | Fujimura et al. | 204/571 |
| 6,010,552 A | 1/2000 | Gasperetti et al. | |
| 6,355,085 B1 * | 3/2002 | Pillin et al. | 75/10.67 |
| 7,736,771 B2 * | 6/2010 | Sullivan | 429/3 |

FOREIGN PATENT DOCUMENTS

| | | |
|---|---|---|
| JP | 39-25863 | 11/1964 |
| JP | 39-25863 B1 | 11/1964 |
| JP | 01-139732 | 6/1989 |
| JP | 07-54065 A | 2/1995 |
| JP | 08-295963 | 11/1996 |
| JP | 10-230349 A | 9/1998 |
| JP | 11-229055 | 8/1999 |
| JP | 2004-322120 A | 11/2004 |

OTHER PUBLICATIONS

Yamao, Fumitaka, et al., "Separation of Inclusions in Liquid Metal Using Fixed Alternating Magnetic Filed", Tetsu-to-Hagane, vol. 83, No. 1, 1997, Japan.
Waki, Norihisa, et al., "Magnetic Separation of Inclusions in Molten Metal Using a High Magnetic Field", Tetsu-to-Hagane, vol. 86, No. 6, 2000, Japan.

* cited by examiner

*Primary Examiner* — George Wyszomierski
*Assistant Examiner* — Tima M McGuthry Banks
(74) *Attorney, Agent, or Firm* — Notaro, Michalos & Zaccaria P.C.

(57) ABSTRACT

An apparatus comprising at least vessel (2) for stocking conductive liquid (1) containing impurities; electromagnetic force generator (3) for generating electromagnetic force (F) capable of circulating the conductive liquid (1) in the conductive liquid (1); and discharging unit (4) for discharging nonmetallic impurities and deemed nonmetallic impurities (21a, 21b) accumulated in low-pressure region (1a) by a pressure difference in conductive liquid (1) induced by the electromagnetic force (F), so that by the electromagnetic force (F), any nonmetallic impurities (21a) and deemed nonmetallic impurities (21b) are driven to the low-pressure region (1a), for example, liquid surface and separated.

6 Claims, 3 Drawing Sheets

PURIFYING APPARATUS AND PURIFYING METHOD

CROSS REFERENCE TO RELATED APPLICATIONS

The present application claims priority on Japanese patent application No. 2005-232477, filed Aug. 10, 2005, and is a 371 application of PCT/JP2006/315765, filed Aug. 9, 2006 which is incorporated here by reference.

TECHNICAL FIELD

The present invention relates to a purifying apparatus and a purifying method. More particularly, the present invention relates to a purifying apparatus and a purifying method that separate and remove impurities in an electroconductive liquid, e.g., an aluminum molten metal.

BACKGROUND ART

As a method of purifying aluminum or an aluminum alloy, there has been a conventionally proposed technology of adding an element that forms a complex compound (which will be referred to as a complex compound forming element hereinafter) with an element serving as an impurity into a molten metal of aluminum or an aluminum alloy containing the element serving as an impurity to precipitate the element serving as an impurity as the complex compound in the aluminum molten metal, causing rectifying rotation to the aluminum molten metal to subject the complex compound to centrifugal separation based on a difference in specific gravity, and collecting the complex compound on a wall surface of an agitated vessel to be removed (Patent Document 1). This method is used for recycling of, e.g., an aluminum resource and, according to this method, when an element serving as an impurity in an aluminum molten metal is specified in advance and a corresponding complex compound forming element, e.g., the element serving as an impurity is Fe or Si, Mn, Zr, or Ca is added and the temperature is maintained at 640 to 700° C. to enable precipitation of a complex compound.

On the other hand, as a purifying method utilizing electromagnetic processing, a method of producing an electromagnetic force in a central (inner) direction in a cylindrical vessel having a molten metal therein by a fixed alternating magnetic field to collect inclusions having low electric conductivities near a vessel wall has been proposed (Non-patent Literature 1). Further, information that a method of applying a strong magnetic field to a molten metal to perform magnetic separation of inclusions was theoretically analyzed and its effectiveness was confirmed from an experiment has been also reported (Non-patent Literature 2).

Patent Document 1: Japanese Patent Application Laid-open No. 229055-1999

Non-patent Literature 1: Fumitaka Yamao, Kensuke Sassa et al., "Separation of Inclusions in Liquid Metal Using Fixed Alternating Magnetic Field", Tetsu-to-Hagane, vol. 83, No. 1, 1997

Non-patent Literature 2: Norihisa Waki, Kensuke Sassa et al., "Magnetic Separation of Inclusions in Molten Metal Using a High Magnetic Field", Tetsu-to-Hagane, vol. 86, No. 6, 2000

DISCLOSURE OF INVENTION

Problem to be Solved by the Invention

However, according to the purifying method of aluminum or an aluminum alloy disclosed in Patent Document 1, since an element serving as an impurity in an aluminum molten metal is reacted with a complex compound forming element to precipitate and remove this element as a complex compound, the element serving as a removable impurity is restricted to an element that reacts with the complex compound forming element. Furthermore, an element serving as a target impurity to be removed and an element forming a complex compound must be selected and added to the aluminum molten metal, and hence this purifying method cannot be applied if the element serving as an impurity cannot be specified in advance. Moreover, a removable impurity may be limited in some cases.

Additionally, according to the technology disclosed in Cited Literature 1, although effectiveness of electromagnetic separation is examined, extraction of inclusions from a vessel wall after separation is not examined, and extracting inclusions alone from the wall surface prior to extraction of a molten metal to the outside of the vessel is difficult. Further, according to the technology disclosed in Cited Literature 2, an effect of magnetic separation is weak, and inclusions after separation cannot be extracted.

Furthermore, these technologies concern either separation of metallic inclusions or separation of non-metallic inclusions, and they cannot simultaneously perform separation of metallic inclusions or separation of non-metallic inclusions in a state where these two types of inclusions are present.

It is an object of the present invention to provide a purifying apparatus and a purifying method that do not have to specify an element serving as an impurity. Moreover, it is another object of the present invention to provide a purifying apparatus and a purifying method that can easily remove an impurity after separation. Additionally, it is still another object of the present invention to provide a purifying apparatus and a purifying method that can remove an element serving as an impurity irrespective of its type. Further, it is yet another object of the present invention to provide a purifying apparatus and a purifying method that can remove impurities which are precipitated as various kinds of compounds irrespective of a metallic nature, a non-metallic nature, or a deemed non-metallic nature.

Means for Solving Problem

To this end, a purifying apparatus according to the present invention comprises: a vessel in which an electroconductive liquid including impurities is stored; an electromagnetic force generation device which produces a downward or upward electromagnetic force that circulates the electroconductive liquid in the electroconductive liquid; and a discharge device which discharges the impurities collected in a low-pressure portion based on a pressure difference in the electroconductive liquid produced by the electromagnetic force. Furthermore, according to a purifying method of the present invention, a downward or upward electromagnetic force is given to an electroconductive liquid in a vessel to be circulated, a pressure difference is generated in the electroconductive liquid by the electromagnetic force, and a non-metallic impurity and a deemed non-metallic impurity in the electroconductive liquid are collected in a low-pressure portion based on the pressure difference to be discharged.

Therefore, when an electromagnetic force is generated upwards or downwards in the electroconductive liquid by the electromagnetic force generation apparatus, this electromagnetic force serves as a driving force to circulate the electroconductive liquid. Moreover, a pressure difference is produced near a liquid level or a bottom portion of the electroconductive liquid by this electromagnetic force. A non-metal impurity and an impurity that is a metal impurity but has a sufficiently small electric conductivity (which will be referred to as a deemed non-metal impurity hereinafter) in the electroconductive liquid, i.e., a non-metal impurity and a deemed non-metal impurity which are not directly driven by the electromagnetic force are collected in the low-pressure portion, i.e., a position near the liquid level or the bottom part based on the pressure difference of the electroconductive liquid. Additionally, when the non-metal impurity and the deemed non-metal impurity collected in the low-pressure portion are discharged to the outside of the vessel by the discharge device, the electroconductive liquid can be purified. That is, electromagnetic separation is performed by utilizing the electromagnetic force serving as the driving force that circulates the electroconductive liquid, thereby purifying the electroconductive liquid.

Further, in the purifying apparatus and the purifying method according to the present invention, a direction of the electromagnetic force generated by the electromagnetic force generation device is not restricted to a specific direction, either a vertically downward direction or a vertically upward direction may be adopted, but the downward direction is preferable. In this case, a liquid level part of the electroconductive liquid is the low-pressure portion having the lowest pressure, and the non-metal impurity and the deemed non-metal impurity are forced up and collected at the liquid level portion based on the pressure difference of the electroconductive liquid. The electroconductive liquid downwardly driven by the electromagnetic force is turned over at the bottom portion in the vessel to flow upwards, and then it is turned over near the liquid level to flow downwards. Here, of impurities contained in the electroconductive liquid, an impurity of a metal whose electric conductivity is large to some extent (which will be referred to as a metallic impurity hereinafter), i.e., a metallic impurity that is directly driven by the electromagnetic force circulates together with the electroconductive liquid, and hence utilizing the pressure difference of the electroconductive liquid to collect this impurity in the low-pressure portion is difficult.

Thus, in the purifying apparatus according to the present invention, it is preferable that a ferromagnetic structure through which the electroconductive liquid can pass is arranged in a circulating flow of the electroconductive liquid in the vessel, a magnetic force generation device which gives a magnetic field to the ferromagnetic structure is provided on an outer side of the vessel, and a metallic impurity circulated together with the electroconductive liquid by the electromagnetic force is caused to adhere to the ferromagnetic structure by a magnetic force. Furthermore, in the purifying method according to the present invention, it is preferable that a ferromagnetic structure is arranged at a position in the electroconductive liquid where a flow of the electroconductive liquid occurs, a direct-current magnetic flux is penetrated through the ferromagnetic structure to form a gradient in a magnetic field around the ferromagnetic structure, and a metallic impurity circulated together with the electroconductive liquid is caused to adhere and to be removed by a magnetic force proportional to the gradient in the magnetic field.

In this case, when the metallic impurity circulated together with the electroconductive liquid by the electromagnetic force is caused to adhere to the ferromagnetic structure and to be separated from the electroconductive liquid, the electroconductive liquid can be purified. That is, the electroconductive liquid can be purified by performing magnetic separation. Since magnetic separation is carried out while circulating the entire electroconductive liquid, the metallic impurity in the electroconductive liquid is gradually removed, thus purifying the electroconductive liquid. In this manner, magnetic separation can be simultaneously performed with the electromagnetic separation to purify the electroconductive liquid.

Here, although arranging the ferromagnetic structure in a circulating flow of the electroconductive liquid to be exposed to a flow of the electroconductive liquid is preferable, arranging the ferromagnetic structure near a position where a flow direction of the circulating flow of the electroconductive liquid is turned from the upward direction to the downward direction is more preferable. In this case, the flow of the electroconductive liquid becomes gentle, adherence of the metallic impurity to the ferromagnetic structure is facilitated, and the metallic impurity is not readily removed by the flow of the electroconductive liquid.

Moreover, in the purifying apparatus according to the present invention, it is preferable that the electromagnetic force generation device is a three-phase alternating-current coil, and arranged around the vessel to form a downward or upward traveling magnetic field in the electroconductive liquid.

Additionally, in the purifying apparatus according to the present invention, it is preferable that a cooler which cools the vessel is provided outside the vessel near a liquid level of the electroconductive liquid, and a heater, e.g., an induction heating coil is provided at a lower part of the vessel to enable temperature adjustment.

Effect of the Invention

According to the purifying apparatus and method of the present invention, the downward or upward electromagnetic force is provided to the electroconductive liquid in the vessel to be circulated, a pressure difference (which is also called an electromagnetic Archimedes force) is produced in the electroconductive liquid by the electromagnetic force, and the non-metallic impurity and the deemed non-metallic impurity in the electroconductive liquid are collected in the low-pressure portion formed at the liquid level or the bottom part of the electroconductive liquid based on the pressure difference to be discharged, thereby readily removing the impurities and purifying the electroconductive liquid.

Further, according to the purifying apparatus of the present invention, since a mechanically movable portion is not included, the structure can be simplified, and the apparatus can be reduced in size. Furthermore, the apparatus hardly fails to operate properly, and hence the reliability can be improved. Moreover, the durability can be improved, and a product life can be prolonged. Additionally, an impurity that is not driven by the electromagnetic force can be separated and removed irrespective of a type of an element serving as the impurity, an element which forms a complex compound with the element serving as the impurity is not added and precipitated as an intermetallic compound to be subjected to centrifugal separation, and hence the present invention can be applied to the impurity whose element type as the impurity is not specified. Further, if the electroconductive liquid is used, it is possible to purify not only a metal, e.g., an aluminum molten metal but also other electroconductive liquids. Therefore, the general versatility of the purifying apparatus can be improved, and the usability of the same can be also enhanced.

Furthermore, in case of the invention which generates the downward electromagnetic force, since the non-metallic impurity and the deemed non-metallic impurity which are not driven by the electromagnetic force can be collected at the liquid level part, these impurities can be easily discharged. Therefore, the structure of the discharge device can be simplified.

Moreover, according to the present invention, when the ferromagnetic structure through which the electroconductive liquid can pass is arranged in the circulating flow of the electroconductive liquid, the metallic impurity circulated together with the electroconductive liquid by the electromagnetic force can be caused to adhere to the ferromagnetic structure, thereby simultaneously separating and removing the metallic impurity while circulating the entire electroconductive liquid. That is, it is possible to remove the metallic impurity in addition to the non-metallic impurity and the deemed non-metallic impurity in the electroconductive liquid. Therefore, irrespective of an impurity contained in the electroconductive liquid as the metallic impurity, the non-metallic impurity, and the deemed non-metallic impurity, these impurities can be removed to excellently purify the electroconductive liquid. Therefore, the impurities precipitated as various kinds of compounds can be removed. Additionally, since the structure that removes the metallic impurity does not have a mechanically movable portion like the structure that removes the non-metallic impurity or the deemed non-metallic impurity, the structure can be simplified, and the apparatus can be reduced in size. Further, since the apparatus hardly fails to operate properly, the reliability can be improved. Furthermore, the durability is improved, and a product life can be prolonged.

Moreover, according to the purifying apparatus of the present invention in which the ferromagnetic structure is disposed near a position where the flow direction of the circulating flow of the electroconductive liquid is turned from the upward direction to the downward direction, the flow of the electroconductive liquid becomes gentle, adherence of the metallic impurity to the ferromagnetic structure is facilitated, and the metallic impurity is not readily separated by the flow of the electroconductive liquid.

Additionally, according to the purifying apparatus of the present invention using the three-phase alternating-current coil as the electromagnetic force generation device, since just flowing the three-phase alternating current enables forming an upward or downward traveling magnetic field, the structure and control can be facilitated.

Further, in the purifying apparatus according to the present invention, when a cylindrical partition wall that partitions the flow of the electroconductive liquid produced near a vessel peripheral wall and an inner flow opposite to this flow is provided in the vessel, since the flow of the electroconductive liquid produced near the vessel peripheral wall and the inner flow opposite to this flow are partitioned by the partition wall, a circulating flow in an up-and-down direction, i.e., a flow passing through the ferromagnetic structure can be assuredly formed.

EXPLANATIONS OF LETTERS OR NUMERALS 1 electroconductive liquid
1a low-pressure portion
2 vessel
3 electromagnetic force generation device
4 discharge device
16 ferromagnetic lattice (ferromagnetic structure)
17 magnetic force generation device (magnet)
21A non-metallic impurity
21B deemed non-metallic impurity
21C metallic impurity
F electromagnetic force

BEST MODE(S) FOR CARRYING OUT THE INVENTION

A structure of the present invention will now be explained hereinafter in detail based on the best mode depicted in the drawings.

Figure 1:
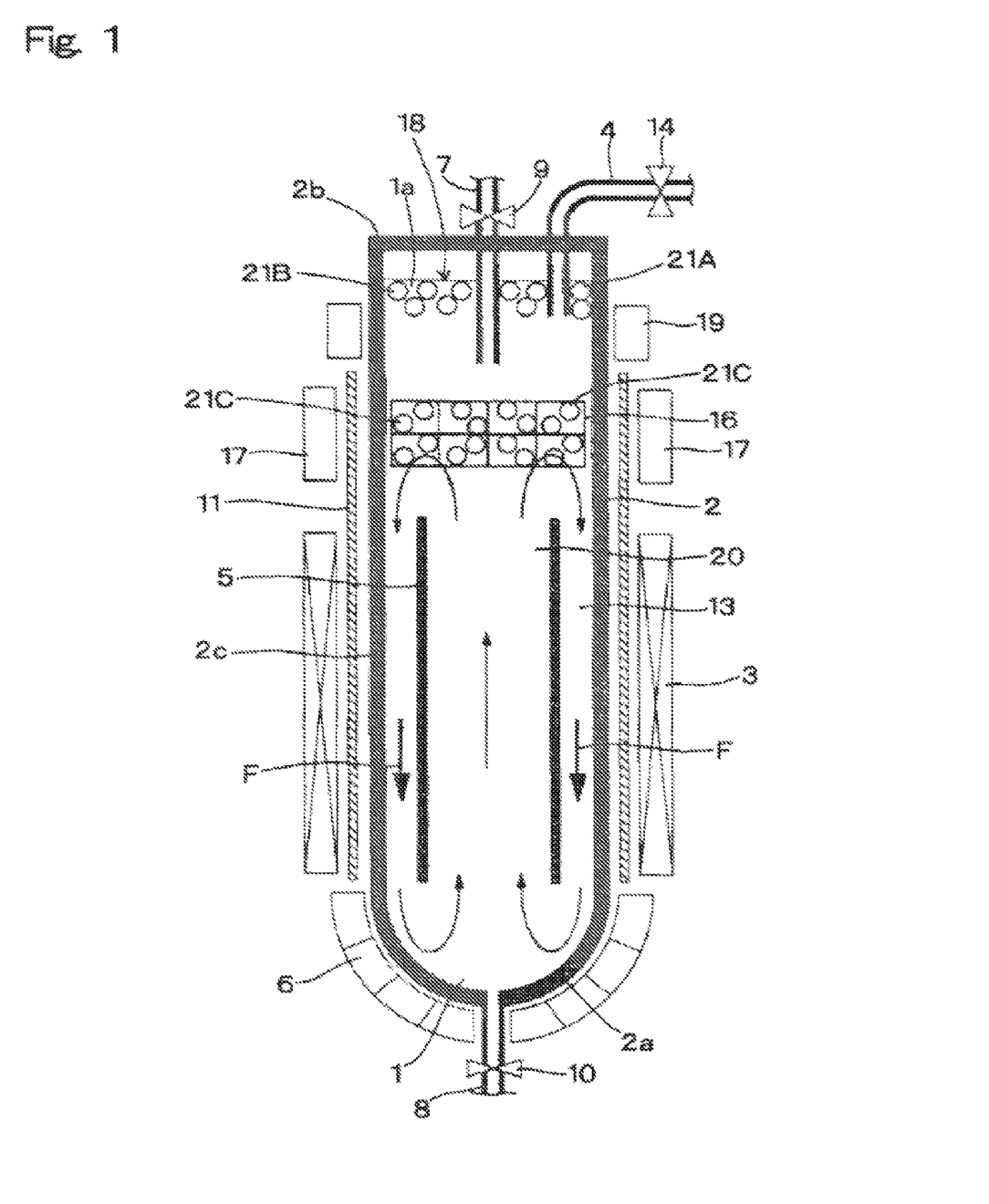
FIG. 1 is a cross-sectional view showing an example of an embodiment of a purifying apparatus according to the present invention.

FIG. 1 shows an example of an embodiment of a purifying apparatus to which the present invention is applied. A purifying apparatus includes a vessel 2 in which an electroconductive liquid 1 containing impurities is stored, an electromagnetic force generation device 3 which generates an electromagnetic force F that circulates the electroconductive liquid 1 in the electroconductive liquid 1, and a discharge device 4 which discharges a non-metallic impurity 21A and a deemed non-metallic impurity 21B collected in a low-pressure portion 1a based on a pressure difference in the electroconductive liquid 1 produced by the electromagnetic force F. In this embodiment, an example of the purifying apparatus which melts and purifies, e.g., an aluminum product collected in recycling of aluminum will be explained. However, the present invention can be of course applied to a purifying apparatus that is used for purposes other than recycling of aluminum.

The electroconductive liquid 1 is a molten metal of aluminum obtained by heating and melting a material to be purified, e.g., a collected aluminum product. In general, an element, e.g., Fe, Mg, Zr, or Si is added in the aluminum product, and these added elements are included as impurities in the aluminum molten metal obtained by melting the aluminum product. The purifying apparatus separates and removes these impurities to purify the aluminum molten metal. However, the electroconductive liquid 1 is not restricted to the aluminum molten metal, and it may be a liquid metal other than the aluminum molten metal or a liquid with the conductivity other than metals.

The vessel 2 is formed of a material which has a sufficiently higher melting point than a temperature of the electroconductive liquid 1 and through which a magnetic line of force can be readily permeated, e.g., a non-ferrous metal such as austenitic stainless steel, copper, or aluminum having a relative permeability close to 1 or a so-called non-magnetic substance such as graphite or ceramics. A cylindrical partition wall 5 is disposed in the vessel 2 by attaching to the cylindrical partition wall 5 by a non-illustrated stay, and partitions a downward flow of the electroconductive liquid 1 produced on the outer side of the partition wall 5 and an upward flow of the electroconductive liquid 1 produced on the inner side of the same. A bottom plate 2a of the vessel 2 has a shape which facilitates inversion of the flow of electroconductive liquid 1, e.g., a semispherical shape. An induction heating coil 6 that heats the electroconductive liquid 1 to adjust a temperature is provided around the bottom plate 2a of the vessel 2. An inlet pipe 7 from which the electroconductive liquid 1 is poured is provided in a lid plate 2b of the vessel 2, and an outlet pipe 8 from which the electroconductive liquid 1 is taken out is provided in the bottom plate 2a, respectively. Valves 9 and 10 are provided to the inlet pipe 7 and the outlet pipe 8, respectively.

The electromagnetic force generation device 3 is constituted of an alternating-current coil which produces a vertically downward traveling magnetic field in this embodiment, and it is arranged to surround a peripheral wall 2c of the vessel 2. In this embodiment, a three-phase alternating-current coil is used as the electromagnetic force generation device 3. However, an alternating-current coil other than the three-phase alternating-current coil may be used.

Figure 2:
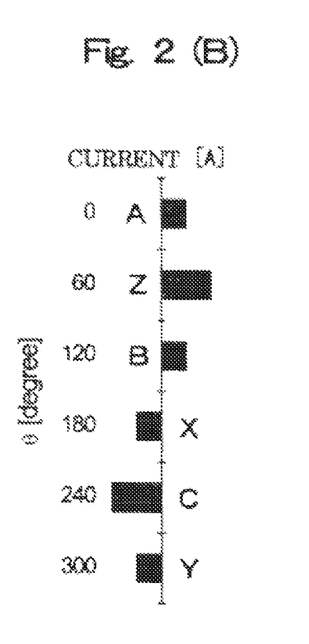
FIG. 2 show a three-phase alternating-current coil as an electromagnetic force generation device, where (A) is a cross-sectional view of the three-phase alternating-current coil, (B) is a view showing a phase difference of the three-phase alternating-current coil, and (C) is a view showing electrical arrangement of the three-phase alternating-current coil.

FIG. 2(A) shows a cross section of a part of the electromagnetic force generation device 3. It is to be noted that a heat shielding plate 11 is omitted in FIG. 2(A). In the three-phase alternating-current coil as the electromagnetic force generation device 3, respective coils 3a are respectively wire-connected to form pairs as combinations of A-X, B-Y, and C-Z, the A, B, and C coils 3a have the same winding direction, the X, Y, and Z coils 3a have the same winding direction, and the winding direction of the A, B, and C coils 3a is opposite to the winding direction of the X, Y, and Z coils 3a. Each coil 3a is wound for several turns to approximately 20 turns in each groove 12a of a core 12. Here, the number of turns is determined to satisfy the condition of (an intensity of a magnetic field)=(the number of turns)×(a current). Further, a current flowing through each coil 3a is obtained from an expression (a current)=(a voltage)÷(an impedance).

The respective coils 3a are arranged toward the lower side of the vessel 2 in an axial direction in the order of A, Z, B, X, C, Y, A, . . . , and Y, and a phase difference of the respective coils 3a is 60 degrees. For example, as shown in FIGS. 2(B) and (C), when A has 0 degree, Z has 60 degrees, B has 120 degrees, X has 180 degrees, C has 240 degrees, and Y has 300 degrees. When a current that is a three-phase alternating current flows from a non-illustrated power supply to the electromagnetic force generation device 3, for example, as indicated by arrows in FIG. 2(A), a magnetic line of force which reaches the electroconductive liquid 1 from the core 12 through the heat shielding plate 11 and the peripheral wall of the vessel 2 and then returns to the core 12 through the vessel 2 and the heat shielding plate 11 is generated near the vessel peripheral wall (an inner side close to the peripheral wall of the vessel). Although the magnetic line of force is produced in accordance with each coil 3a, a downward traveling magnetic field in the axial direction of the vessel 2 is formed depending on a phase difference or winding directions of the coils 3a adjacent to each other or a change in a current flowing through each coil 3a.

When the electromagnetic force generation device 3 is used to form the downward traveling magnetic field, a current flowing in a circumferential direction is produced at a position of the electroconductive liquid 1 near the vessel 2, i.e., a position where the magnetic line of force permeates in a radial direction. For example, a current flowing from an inner side toward a front side in the drawing is generated at a P1 position in FIG. 2(A), and a current flowing from the front side toward the inner side is produced at a P2 position in the same. A downward electromagnetic force F is generated from the traveling magnetic field and the currents produced in the electroconductive liquid 1 based on the Fleming's left-hand rule. Although directions of the currents produced in the electroconductive liquid 1 may be opposite depending on positions, the winding direction of the A, B, and C coils 3a is also opposite to the winding direction of the X, Y, and Z coils 3a, and hence the constantly downward electromagnetic force F is generated. This electromagnetic force F is produced in a flow path 13 between the vessel 2 and the partition wall 5, i.e., the flow path on the outer side of the partition 5, and downwardly drives the electroconductive liquid 1.

The discharge device 4 is a pipe from which the electroconductive liquid 1 is sucked and discharged at a position near a liquid level 18, and it is disposed to the lid plate 2b of the vessel 2. The discharge device 4 is connected with, e.g., a non-illustrated pump. Furthermore, a valve 14 is provided at the midpoint of the discharge device 4.

In the purifying apparatus, a ferromagnetic structure 16 to which a metallic impurity 21C circulating together with the electroconductive liquid 1 adheres by the electromagnetic force F is provided in the electroconductive liquid 1. The ferromagnetic structure 16 facilitates permeation of a magnetic field, increases a gradient in a magnetic field on a surface thereof, and thereby causes the metallic impurity 21 to adhere thereto, and it is constituted by assembling iron rods having a high magnetic permeability into a lattice-like shape (which will be referred to as a ferromagnetic lattice 16 hereinafter) in this embodiment in order to prevent a flow of the electroconductive liquid from being interrupted and to increase a surface area. The electroconductive liquid can pass through spaces between the rods constituting the ferromagnetic lattice 16. It is preferable to provide the ferromagnetic lattice 16 at a position where the flow of the electroconductive liquid 1 caused due to the electromagnetic force in the vessel 2 passes, especially a position where a speed of the flow of the electroconductive liquid is reduced or the electroconductive liquid is apt to stop even though it is flowing, and it is desirable to dispose the ferromagnetic lattice 16 in, e.g., a region where the flow of the electroconductive liquid above the partition wall 5 is turned. In this case, since the electroconductive liquid 1 passes through the ferromagnetic lattice 16 when the upward flow of the electroconductive liquid 1 formed in the vessel 2 is turned to the downward flow, a speed of the flow of the electroconductive liquid 1 is reduced or this flow is apt to stop, the electroconductive liquid 1 slowly passes through the lattice 16, a metallic impurity 21C precipitated in the electroconductive liquid 1 as a crystal of an intermetallic compound is thereby apt to adhere to the ferromagnetic lattice 16 due to the magnetic force, and the metallic impurity 21C is hard to be removed when it once adheres.

Figure 3:
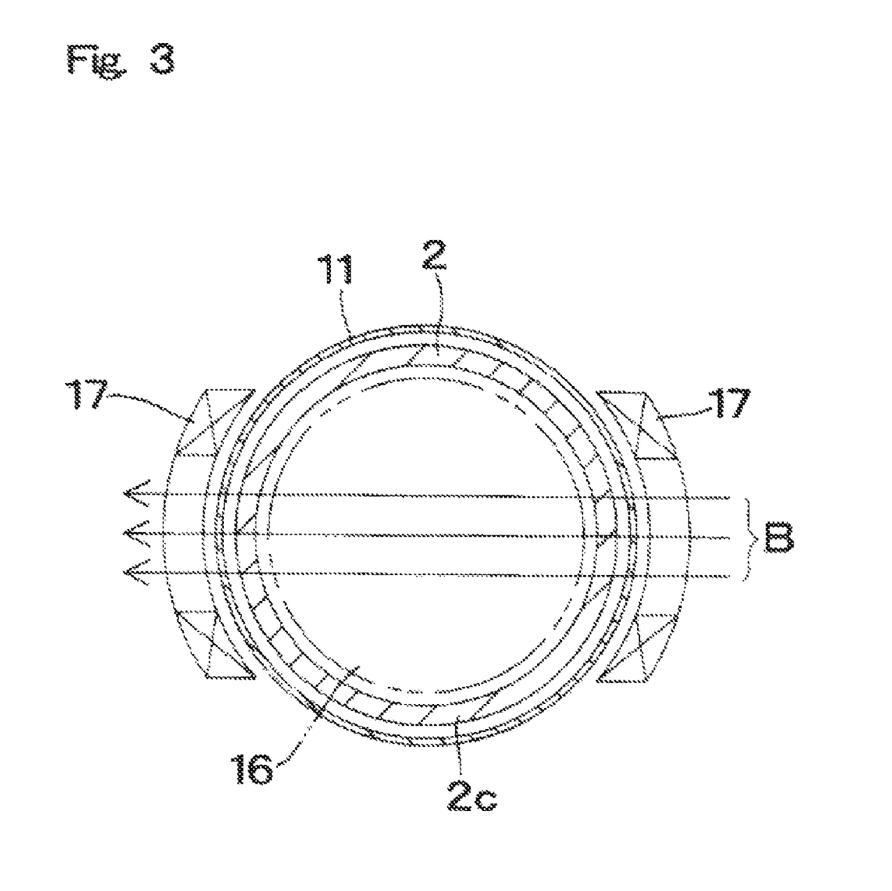
FIG. 3 is a cross-sectional view showing a magnetic force generation device that allows a magnet to function.

A magnetic force generation device 17 which gives a magnetic field to the ferromagnetic lattice 16 in the electroconductive liquid is arranged outside the vessel 2. This magnetic force generation device 17 generates a magnetic line of force running through the vessel 2 in the radial direction to permeate the ferromagnetic lattice 16, and it is constituted of, e.g., a pair of direct-current coils (which will be referred to as direct-current coils 17 hereinafter) disposed outside the vessel 2 as shown in FIG. 3. The respective direct-current coils 17 are arranged to face each other with the ferromagnetic lattice 16 sandwiched therebetween. When directions of currents flowing through the respective direct-current coils 17 are opposed to each other as seen from the outside of the vessel 2 in the radial direction, a magnetic line of force B running through the vessel 2 in the radial direction can be generated. However, the device which generates a magnetic line of force running through the vessel 2 in the radial direction is not restricted to the pair of direct-current coils 17, and it may be, e.g., a pair of permanent magnets. That is, the magnetic line of force B running through the vessel 2 in the radial direction may be produced by disposing the pair of permanent magnets on a diameter of the vessel 2 with the ferromagnetic lattice 16 sandwiched therebetween and setting an N pole of one permanent magnet to face the vessel 2 whilst setting an S pole of the other permanent magnet to face the vessel 2. Moreover, the magnetic force generation device 17 may any other devices.

A cooler 19 which cools the electroconductive liquid 1 near the liquid level 18 is disposed around the peripheral wall 2c of the vessel 2. The cooler 19 is arranged at a position corresponding to a lower part of the liquid level of the electroconductive liquid so as to surround the peripheral wall 2c, and provided to cool the peripheral wall of the vessel. Additionally, the cooler 19 and the induction heating coil 6 provided at the lower part of the vessel 2 adjust a temperature of the electroconductive liquid to fall within a temperature range that is suitable for execution of electromagnetic separation and magnetic separation. Further, the heat shielding plate 11 that surrounds the vessel 2 to prevent radiant heat from the vessel 2 is provided between the vessel 2 and the electromagnetic force generation device 3 and between the vessel 2 and the magnetic force generation device 17, thereby protecting the electromagnetic force generation device 3 and the magnetic force generation device 17 against the radiant heat from the vessel 2. The heat shielding plate 11 has, e.g., a cylindrical shape, and is formed of a non-ferrous metal such as austenitic stainless steel, copper, or aluminum having a relative permeability close to 1, or a so-called non-magnetic substance such as graphite or ceramics.

A purifying method will now be explained while taking aluminum to be recycled as an example. According to the purifying method, the electromagnetic force F is given to the electroconductive liquid 1 in the vessel 2 to be circulated, a pressure difference is produced in the electroconductive liquid 1 by the electromagnetic force F, and the non-metallic impurity 21A and the deemed non-metallic impurity 21B in the electroconductive liquid 1 are collected in the low-pressure portion 1a to be discharged by utilizing this pressure difference. In this embodiment, the downward electromagnetic force F is produced. Furthermore, a magnetic flux is flowed through the ferromagnetic lattice 16 in the electroconductive liquid 1 from the magnetic force generation device 17 arranged outside the vessel 2, and the metallic impurity 21C circulated together with the electroconductive liquid 1 by the electromagnetic force F is caused to adhere to the ferromagnetic lattice 16 and then removed.

First, the valve 9 of the inlet pipe 7 is opened, and an aluminum molten metal as the electroconductive liquid 1 molten in a non-illustrated fusion furnace is poured into the vessel 2 from the inlet pipe 7. An impurity in the aluminum molten metal is precipitated as a crystal when molten, and the aluminum molten metal is heated to a temperature at which this precipitate is maintained, e.g., 700 to 900° C. Moreover, a predetermined amount of the electroconductive liquid 1 is poured, and then the valve 9 is closed. Additionally, the induction heating coil 6 is used to adjust a temperature of the electroconductive liquid 1 to the above-explained temperature as required. That is, thermal insulation is effected. As a result, the fluidity of the electroconductive liquid 1 can be prevented from being degraded.

Then, the electromagnetic force generation device 3 and the magnetic force generation device 17 are energized. When the electromagnetic force generation device 3 is energized, the downward electromagnetic force F is produced in the electroconductive liquid 1 in the flow path 13 outside the partition wall 5. This electromagnetic force F downwardly drives the electroconductive liquid 1 to be circulated in the vessel 2 in the vertical direction. That is, the electroconductive liquid 1 which has flowed down in the flow path 13 on the outer side of the partition wall 5 is turned at the bottom portion in the vessel 2 to flow upwards in a flow path 20 on the inner side of the partition wall 5, and then it is turned while passing through the ferromagnetic lattice 16 to flow downwards in the flow path 13 on the outer side of the partition wall 5.

At this time, of impurities contained in the electroconductive liquid 1, the non-metallic impurity 21A which is not submitted to a action of the electromagnetic force F and the deemed non-metallic impurity 21B which can be considered to have a small electric conductivity and be not submitted to the action of the electromagnetic force F even though it is a metal is not driven by the electromagnetic force F, and hence it is not vertically circulated in the vessel 2. On the other hand, the metallic impurity 21C which has an electric conductivity that is large to some extent and is sufficiently submitted to the action of the electromagnetic force F is driven by the electromagnetic force F, and it is circulated in the vertical direction in the vessel 2.

A pressure difference is produced in the electroconductive liquid 1 by the electromagnetic force F. Since the electromagnetic force generation device 3 generates the downward electromagnetic force F, a so-called electromagnetic Archimedes force provides the highest pressure at the bottom part of the electroconductive liquid 1, the pressure is reduced toward the upper side, and a part near the liquid level 18 is the low-pressure portion 1a having the lowest pressure. The non-metallic impurity 21A and the deemed non-metallic impurity 21B which is not driven by the electromagnetic force F gradually moves toward the low-pressure portion 1a due to the pressure difference of the electroconductive liquid 1. That is, electromagnetic separation is performed. Further, after elapse of a time sufficient to collect all of the non-metallic impurity 21A and the deemed non-metallic impurity 21B included in the electroconductive liquid 1 in the low-pressure portion 1a, the non-metallic impurity 21A and the deemed non-metallic impurity 21B is discharged together with the electroconductive liquid 1 by the discharge device 4. In this manner, the electromagnetic force F serving as the driving force that circulates the electroconductive liquid 1 is utilized to perform electromagnetic separation, thereby excellently separating the non-metallic impurity 21A and the deemed non-metallic impurity 21B included in the electroconductive liquid 1. When the electroconductive liquid 1 is the aluminum molten metal, an additive element, e.g., Si is separated as the non-metallic impurity 21A or the deemed non-metallic impurity 21B.

Furthermore, when the magnetic force generation device 17 is energized, a magnetic line of force runs through the ferromagnetic lattice 16. The metallic impurity 21C in the electroconductive liquid 1 is subjected to the action of the electromagnetic force F generated by the electromagnetic force generation device 3 to vertically circulate in the vessel 2 together with the electroconductive liquid 1, and adheres to the ferromagnetic lattice 16 by the magnetic force when passing through the ferromagnetic lattice 16. That is, magnetic separation is carried out. Moreover, after elapse of a time sufficient for all of the metallic impurity 21C included in the electroconductive liquid 1 to adhere to the ferromagnetic lattice 16, the electroconductive liquid 1 from which the metallic impurity 21C has been separated is taken out from the outlet pipe 8. In this manner, magnetic separation is performed while circulating the electroconductive liquid 1, thereby excellently separating the metallic impurity 21C included in the electroconductive liquid 1. When the electroconductive liquid 1 is the aluminum molten metal, an additive element, e.g., Fe, Mg, or Zr is separated as the metallic impurity 21C.

It is to be noted that the purifying apparatus performs electromagnetic separation concurrently with magnetic separation by the ferromagnetic lattice 16 and the magnetic force generation device 17, and hence the non-metallic impurity 21A and the deemed non-metallic impurity 21B is actually discharged together with the electroconductive liquid 1 by the discharge device 4 after elapse of a time sufficient for both electromagnetic separation and magnetic separation, and then the electroconductive liquid 1 is taken out from the outlet pipe 8. Although the impurity 21 included in the electroconductive liquid 1 can be roughly classified into the non-metallic impurity 21A, the deemed non-metallic impurity 21B, and the metallic impurity 21C, the purifying apparatus can carry out electromagnetic separation and magnetic separation simultaneously, and can separate all the impurities included in the electroconductive liquid 1 good. Therefore, the electroconductive liquid 1 can be purified with high performance. In case of purifying aluminum taken as an example in this embodiment, metal inclusions are actually present in the form of intermetallic compounds (e.g., Ai-Si—Fe) in aluminum. Since these compounds are precipitated as crystals when aluminum is molten, they are subjected to magnetic separation. On the other hand, the non-metallic impurity or the deemed non-metallic impurity having a melting point lower than that of aluminum is not present or it has a concentration that is not a problem even if it is present, and it can be considered that such a non-metallic impurity is usually a compound having a high melting point (e.g., Si—C). Therefore, most inclusions, i.e., impurities are removed based on electromagnetic separation and magnetic separation. However, when an element that becomes an impurity that is dissolved in the molten metal when aluminum is molten is present depending circumstances, an impurity that is required to precipitate this element as a crystal of an intermetallic compound may be added.

According to the present invention, since electromagnetic separation is performed to remove the non-metallic impurity 21A and the deemed non-metallic impurity 21B, any impurities can be assuredly separated and removed as long as they are impurities which do not conduct electricity and are not driven by the electromagnetic force F or which are considered to have a sufficiently small electric conductivity and be not driven by the electromagnetic force F. Additionally, the present invention can be applied to the impurities 21A and 21B whose types are not specified.

Likewise, since magnetic separation is carried out to remove the metallic impurity 21C, impurities including extensive metal elements can be assuredly separated and removed. Further, the present invention can be applied to the metallic impurity 21C whose element is not specified.

It is to be noted that the foregoing embodiment is an example of preferred embodiments according to the present invention, but the present invention is not restricted thereto and can be modified in many ways without departing from the scope of the invention.

For example, although the present invention is constituted as a purifying apparatus which simultaneously performs electromagnetic separation and magnetic separation in one vessel while vertically circulating the electroconductive liquid by giving the downward electromagnetic force to the electroconductive liquid in the vessel by the traveling magnetic field based on the three-phase alternating current in this embodiment, the present invention may be constituted as a purifying apparatus which performs electromagnetic separation alone without using the magnetic force generation device 17 and the ferromagnetic lattice 16 or by omitting installation of these devices. In such a case, even though the metallic impurity 21C cannot be subjected to magnetic separation, the non-metallic impurity 21A and the deemed metallic impurity 21B can be collected at the liquid level or in the bottom part of the molten metal to be readily removed when the metallic impurity 21C does not have to be separated from the electroconductive liquid 1 or when it is obvious that the metallic impurity 21C is not included in the electroconductive liquid 1. Further, electromagnetic separation and magnetic separation may be performed in different vessels or at different timings.

Further, although the member having the lattice-like shape is used as the ferromagnetic structure 16 in the above explanation, this member is not restricted to the lattice-like shape as long as it has a shape which enables the metallic impurity 21C to adhere thereto while excellently allowing passage of the circulating electroconductive liquid 1. For example, it is possible to adopt the member having a shape obtained by spirally winding a linear ferromagnetic substance or a lump shape tangled like a net. Furthermore, the ferromagnetic structure 16 may be constituted of a plurality of ferromagnetic plates arranged at intervals in parallel with a flow direction of the electroconductive liquid 1.

Moreover, although the downward electromagnetic force F is generated by the electromagnetic force generation device 3 in the above explanation, the direction of the electromagnetic force F is not restricted to the downward direction. For example, the upward electromagnetic force F may be generated. Additionally, it is good enough for the electromagnetic force F to have the downward or upward direction and have these directions as main components, a flow direction of the electroconductive liquid 1 itself does not become a problem, and an effect of electromagnetic separation can be obtained even if the electroconductive liquid 1 spirally flows. Incidentally, when the upward electromagnetic force F is generated, a pressure is high near the liquid level 18 of the electroconductive liquid 1 whilst the pressure is low at the bottom part of the same, and hence the non-metallic impurity 21A and the deemed non-metallic impurity 21B moves down based on a pressure difference of the electroconductive liquid 1. Therefore, the non-metallic impurity 21A and the deemed non-metallic impurity 21B included in the electroconductive liquid 1 can be collected in the bottom portion in the vessel 2, and it can be discharged by utilizing the outlet pipe 8. In this case, since a device that is used to discharge the impurities 21A and 21B can be omitted, the structure of the purifying apparatus can be further simplified.

Further, although electromagnetic separation is carried out for a time that is sufficient to collect all of the non-metallic impurity 21A and the non-metallic impurity 21B included in the electroconductive liquid 1 in the low-pressure portion 1a in the above explanation, the time for electromagnetic separation is not restricted thereto. When the grade of purification is low and it is sufficient, the time for electromagnetic separation may be shortened. Likewise, although magnetic separation is effected for the time that is sufficient for all of the metallic impurity 21C included in the electroconductive liquid 1 to adhere to the ferromagnetic lattice 16 in the above explanation, the time for magnetic separation is not restricted thereto. When the time is sufficient due to a low purity, the time for magnetic separation may be shortened. That is, the time for execution of electromagnetic separation or the time for execution of magnetic separation can be determined in accordance with a required purity.

Furthermore, although the alternating-current coil is used as the electromagnetic force generation device 3 in the above explanation, a device other than the alternating-current coil may be used to generate the electromagnetic force F. For example, when a temperature of the electroconductive liquid 1 is relatively low, an electrode formed of a material having a melting point sufficiently higher than the temperature of the electroconductive liquid 1 may be used to directly flow direct-current electricity to the electroconductive liquid 1, and a magnetic line of force perpendicular to this direct-current electricity may be generated, thereby producing the downward electromagnetic force F in the electroconductive liquid 1 based on the Fleming's left-hand rule. In this case, the structure that produces the electromagnetic force F is simplified, thus reducing a manufacturing cost.

Moreover, although the alternating-current coil is used as the electromagnetic force generation device 3 to generate the traveling magnetic field in the above explanation, a direct-current coil or a magnet may be used in place of the alternating-current coil and the direct-current coil or the magnet may be moved to produce the traveling magnetic field, for example.

Additionally, although purification of aluminum has been taken as the example in the above explanation, the electroconductive liquid 1 to be purified is not restricted to aluminum, and a metal other than aluminum, e.g., tin, lithium, or sodium may be used. It is needless to say that a temperature of a molten metal as a purification target in this case must be set to a temperature at which an impurity is precipitated as a crystal when the metal is molten or a temperature at which the impurity is not dissolved in order to execute electromagnetic separation and magnetic separation but, when a dissolved impurity is present in the molten metal, this impurity and an impurity which forms an intermetallic compound with inclusions may be added.

EXAMPLE 1

When purifying a molten metal obtained by melting an aluminum product collected in recycling of aluminum, purification can be carried out under the following conditions, for example.

A capacity of the vessel 2: 100 to 200 liters

A temperature of the electroconductive liquid 1: 700 to 900° C.

A magnetic field generated by the magnetic force generation device 17: 1 to 3 teslas A voltage of the three-phase alternating-current coil as the electromagnetic force generation device 3: 200 to 250 volts A current of the three-phase alternating-current coil as the electromagnetic force generation device 3: 150 to 200 amperes A frequency of the three-phase alternating-current coil as the electromagnetic force generation device 3: 10 to 20 hertz A magnetic field generated by the three-phase alternating-current coil as the electromagnetic force generation device 3 (a maximum value): 2 teslas

The invention claimed is:

1. A purifying apparatus comprising:
   a vessel in which an electroconductive liquid including impurities is stored;
   an electromagnetic force generation device which produces a downward or upward electromagnetic force that circulates the electroconductive liquid;
   a discharge device which discharges the impurities collected in a low-pressure portion based on a pressure difference in the electroconductive liquid produced by the electromagnetic force;
   a ferromagnetic structure through which the electroconductive liquid can pass arranged in a circulating flow of the electroconductive liquid in the vessel; and
   a magnetic force generation device which is arranged on an outer side of the vessel and gives a magnetic field to the ferromagnetic structure to make a magnetic force to generate in the ferromagnetic structure;
   wherein a metallic impurity circulated together with the electroconductive liquid by the electromagnetic force is caused to adhere to the ferromagnetic structure by the magnetic force, and
   wherein the ferromagnetic structure is disposed near a position where a flow direction of the circulating current of the electroconductive liquid is turned from the upward direction to the downward direction.

2. The purifying apparatus according to claim 1, wherein the electromagnetic force generation device generates the downward electromagnetic force.

3. The purifying apparatus according to claim 1, wherein the electromagnetic force generation device is a three-phase alternating-current coil, and arranged around the vessel to form a downward or upward traveling magnetic field in the electroconductive liquid.

4. A purifying apparatus comprising:
   a vessel in which an electroconductive liquid including impurities is stored;
   an electromagnetic force generation device which produces a downward or upward electromagnetic force that circulates the electroconductive liquid;
   a discharge device which discharges the impurities collected in a low-pressure portion based on a pressure difference in the electroconductive liquid produced by the electromagnetic force;
   a ferromagnetic structure through which the electroconductive liquid can pass arranged in a circulating flow of the electroconductive liquid in the vessel; and
   a magnetic force generation device which is arranged on an outer side of the vessel and gives a magnetic field to the ferromagnetic structure to make a magnetic force to generate in the ferromagnetic structure;
   wherein a metallic impurity circulated together with the electroconductive liquid by the electromagnetic force is caused to adhere to the ferromagnetic structure by the magnetic force, and
   wherein a cooler which cools the vessel is provided outside the vessel near a liquid level of the electroconductive liquid, and a heater is provided on a lower side of the cooler to enable temperature adjustment.

5. The purifying apparatus according to claim 4, wherein the electromagnetic force generation device generates the downward electromagnetic force.

6. The purifying apparatus according to claim 4, wherein the electromagnetic force generation device is a three-phase alternating-current coil, and arranged around the vessel to form a downward or upward traveling magnetic field in the electroconductive liquid.

* * * * *